United States Patent
Miller et al.

(10) Patent No.: US 11,642,816 B2
(45) Date of Patent: May 9, 2023

(54) FLUOROELASTOMER COVERED ELASTOMERIC TOOLING FOR COMPOSITE MANUFACTURING

(71) Applicant: Rubbercraft Corporation of California, Ltd., Long Beach, CA (US)

(72) Inventors: Finley Miller, Long Beach, CA (US); Robert Harshberger, Lakewood, CA (US); Mathias Hecht, Flagstaff, AZ (US)

(73) Assignee: Rubbercraft Corporation of California, Ltd., Long Beach, CA (US)

( * ) Notice: Subject to any disclaimer, the term of this patent is extended or adjusted under 35 U.S.C. 154(b) by 931 days.

(21) Appl. No.: 16/148,902

(22) Filed: Oct. 1, 2018

(65) Prior Publication Data
US 2019/0099923 A1  Apr. 4, 2019

Related U.S. Application Data

(60) Provisional application No. 62/567,632, filed on Oct. 3, 2017.

(51) Int. Cl.
| | |
|---|---|
| *B29C 41/22* | (2006.01) |
| *B29C 33/40* | (2006.01) |
| *B29C 33/38* | (2006.01) |
| *B29C 43/36* | (2006.01) |
| *B29C 33/50* | (2006.01) |

(Continued)

(52) U.S. Cl.
CPC ........ *B29C 33/405* (2013.01); *B29C 33/3842* (2013.01); *B29C 33/505* (2013.01); *B29C 41/22* (2013.01); *B29C 43/3642* (2013.01); *B29C 43/12* (2013.01); *B29C 70/342* (2013.01); *B29C 2043/3644* (2013.01); *B29K 2105/0872* (2013.01); *B29K 2823/16* (2013.01); *B29K 2827/12* (2013.01); *B29K 2827/16* (2013.01);

(Continued)

(58) Field of Classification Search
CPC . B29C 33/405; B29C 33/3842; B29C 33/505; B29C 41/22; B29C 43/3642; B29C 43/12; B29C 70/342; B29C 2043/3644; B29K 2105/0872; B29K 2823/16; B29K 2827/12; B29K 2827/16; B29K 2883/00; B29K 2995/007

USPC ....................................................... 264/320
See application file for complete search history.

(56) References Cited

U.S. PATENT DOCUMENTS

| 458,349 A | 8/1891 | Greene |
|---|---|---|
| 2,138,884 A | 12/1938 | Robinson |

(Continued)

FOREIGN PATENT DOCUMENTS

| DE | 102015010000 | 2/2017 |
|---|---|---|
| EP | 1308257 | 5/2003 |

(Continued)

*Primary Examiner* — Jeffrey M Wollschlager
*Assistant Examiner* — Xue H Liu
(74) *Attorney, Agent, or Firm* — Sheppard, Mullin, Richter & Hampton LLP

(57) ABSTRACT

A multi-layer elastomeric tooling for the manufacturing of composite structures is disclosed. The tooling comprises an elastomeric base material with an outer layer of fluoroelastomer. The base material can, in certain embodiments, be selected for its mechanical or thermal performance or low cost without the limitation of being a contact material. The outer material can, in various embodiments, have inferior mechanical properties, or durometers different than the base material or can be a contact or barrier material.

9 Claims, 5 Drawing Sheets

(51) Int. Cl.
 *B29K 105/08* (2006.01)
 *B29C 70/34* (2006.01)
 *B29C 43/12* (2006.01)

(52) U.S. Cl.
 CPC ...... *B29K 2827/18* (2013.01); *B29K 2883/00* (2013.01); *B29K 2995/007* (2013.01)

(56) References Cited

U.S. PATENT DOCUMENTS

| | | | |
|---|---|---|---|
| 3,084,961 A | 4/1963 | Merriman | |
| 3,230,975 A | 1/1966 | Mercier | |
| 4,148,597 A | 4/1979 | Larsen | |
| 4,852,916 A | 8/1989 | Johnson | |
| 4,858,966 A | 8/1989 | Ciriscioli et al. | |
| 5,071,338 A | 12/1991 | Dublinski et al. | |
| 5,807,593 A | 9/1998 | Thompson | |
| 6,116,884 A | 9/2000 | Rowley et al. | |
| 6,435,242 B1 | 8/2002 | Reis | |
| 6,447,916 B1 | 9/2002 | Van Gool | |
| 6,898,838 B2 | 5/2005 | Gordon | |
| 7,052,567 B1 | 5/2006 | Blackmore | |
| 7,665,718 B1 | 2/2010 | Benson | |
| 2007/0151983 A1 | 7/2007 | Nimesh et al. | |
| 2010/0015265 A1 | 1/2010 | Vontell | |
| 2010/0170613 A1 | 7/2010 | Kendall et al. | |
| 2010/0186899 A1 | 7/2010 | Jackson et al. | |
| 2011/0016686 A1 | 1/2011 | Earls | |
| 2011/0277918 A1 | 11/2011 | Lee et al. | |
| 2012/0219660 A1 | 8/2012 | Sana et al. | |
| 2012/0235336 A1 | 9/2012 | Sana et al. | |
| 2016/0176073 A1 | 6/2016 | Spexarth et al. | |
| 2016/0339682 A1 | 11/2016 | Bahe et al. | |

FOREIGN PATENT DOCUMENTS

| | | |
|---|---|---|
| EP | 2343181 A1 | 7/2011 |
| JP | 54-039445 | 3/1979 |
| JP | S58173612 | 10/1983 |
| JP | H05138749 | 6/1993 |
| JP | H05329856 | 12/1993 |
| JP | H08267548 | 10/1996 |
| JP | 2003214565 | 7/2003 |
| JP | 2005093656 | 4/2005 |
| JP | 2007-249234 | 9/2007 |
| JP | 2009061343 | 3/2009 |
| JP | 2009248512 | 10/2009 |
| JP | 2010131864 | 6/2010 |
| JP | 2011161830 | 8/2011 |
| WO | 2008015115 A1 | 2/2008 |

FLUOROELASTOMER COVERED ELASTOMERIC TOOLING FOR COMPOSITE MANUFACTURING

CROSS-REFERENCE TO RELATED APPLICATION

The present application claims priority to U.S. Provisional Application No. 62/567,632, filed on Oct. 3, 2017, and entitled FLUOROELASTOMER COVERED ELASTOMERIC TOOLING FOR COMPOSITE MANUFACTURING, the entire contents of which are incorporated by reference as if fully set forth herein.

TECHNICAL FIELD

The present disclosure relates generally to the field of composites fabrication and, more particularly, to tooling for the manufacturing of composites.

BACKGROUND

Elastomeric tooling can be used in the manufacturing of composites. Elastomeric tooling can be particularly advantageous where the elastic properties of the materials provide advantages over hard tooling. Elastomeric tooling can be used at room temperature for applications such as debulking. Elastomeric tooling can also be used at elevated temperatures as trapped tooling, reusable vacuum bags, or for pressure distribution or intensification during the curing process.

SUMMARY OF THE INVENTION

The present disclosure may be embodied in tooling for forming composites comprising an elastomeric outer layer comprising a fluoroelastomer, the elastomeric outer layer substantially defining an outer surface of the elastomeric tooling; and an elastomeric inner layer adhered to the elastomeric outer layer, the elastomeric inner layer comprising a base material that is different from the fluoroelastomer.

In an embodiment, the fluoroelastomer is Viton.

In an embodiment, the base material comprises at least one of: silicone, butyl-rubber, or ethylene propylene diene monomer rubber (EPDM).

In an embodiment, the elastomeric tooling further comprises an elastomeric interface layer positioned between the elastomeric outer layer and the elastomeric inner layer.

In an embodiment, the elastomeric interface layer facilitates adhesion between the elastomeric outer layer and the elastomeric inner layer.

In an embodiment, the elastomeric interface layer comprises vinyl-methyl-polysiloxane (VMQ) silicone.

In an embodiment, the elastomeric tooling is a mandrel, and the elastomeric inner layer defines an innermost portion of the mandrel.

In an embodiment, the elastomeric tooling is a bladder, the elastomeric inner layer substantially defines an inner cavity, and the elastomeric tooling can be expanded by applying a positive pressure to the inner cavity.

In an embodiment, the elastomeric tooling is a sheet.

In an embodiment, the fluoroelastomer has a durometer greater than the base material.

The present disclosure may also be embodied in a method in which a fluoroelastomer layer is created within a mold, the fluoroelastomer layer comprising a fluoroelastomer material. A base material is applied to the mold, the base material being different from the fluoroelastomer material. The fluoroelastomer layer and the base material are co-cured to create an elastomeric tooling.

In an embodiment, the creating the fluoroelastomer layer within the mold comprises: dissolving the fluoroelastomer material in a solvent to form a fluoroelastomer solution; applying the fluoroelastomer solution to the mold; and drying the fluoroelastomer solution to create the fluoroelastomer layer within the mold.

In an embodiment, the base material is applied to the fluoroelastomer layer, and co-curing the fluoroelastomer layer and the base material adheres the fluoroelastomer layer to the base material.

In an embodiment, an interface layer is applied to the fluoroelastomer layer, the interface layer comprising an interface material different from the fluoroelastomer material and the base material.

In an embodiment, co-curing the fluoroelastomer layer and the base material to create an elastomeric tooling comprises co-curing the fluoroelastomer layer, the interface layer, and the base material to create an elastomeric tooling, and the interface layer adheres the fluoroelastomer layer to the base material.

In an embodiment, the fluoroelastomer material comprises Viton, the interface material comprises vinyl-methyl-polysiloxane (VMQ) silicone, and the base material comprises at least one of: silicone, butyl rubber, or ethylene propylene diene monomer rubber (EPDM).

The present disclosure may also be embodied in a method comprising positioning a composite prepreg on an elastomeric tooling, curing the composite prepreg on the elastomeric tooling to create a cured composite structure, and removing the elastomeric tooling from the cured composite structure. The elastomeric tooling comprises an elastomeric outer layer comprising a fluoroelastomer, the elastomeric outer layer substantially defining an outer surface of the elastomeric tooling, and an elastomeric inner layer adhered to the elastomeric outer layer, the elastomeric inner layer comprising a base material that is different from the fluoroelastomer.

In an embodiment, the composite prepreg contacts the elastomeric outer layer, and does not contact the elastomeric inner layer.

In an embodiment, the fluoroelastomer material comprises Viton.

In an embodiment, the base material comprises at least one of: silicone, butyl rubber, or ethylene propylene diene monomer rubber (EPDM).

Although various combinations of limitations have been disclosed respecting each of the systems and methods described above, it should be appreciated that these do not constitute every limitation disclosed herein, nor do they constitute every possible combination of limitations. As such, it should be appreciated that additional limitations and different combinations of limitations presented within this disclosure remain within the scope of the disclosed invention.

These and other features and advantages of the invention should become more readily apparent from the detailed description of the preferred embodiments set forth below taken in conjunction with the accompanying drawings, which illustrate, by way of example, the principles of the invention.

Figure 1:
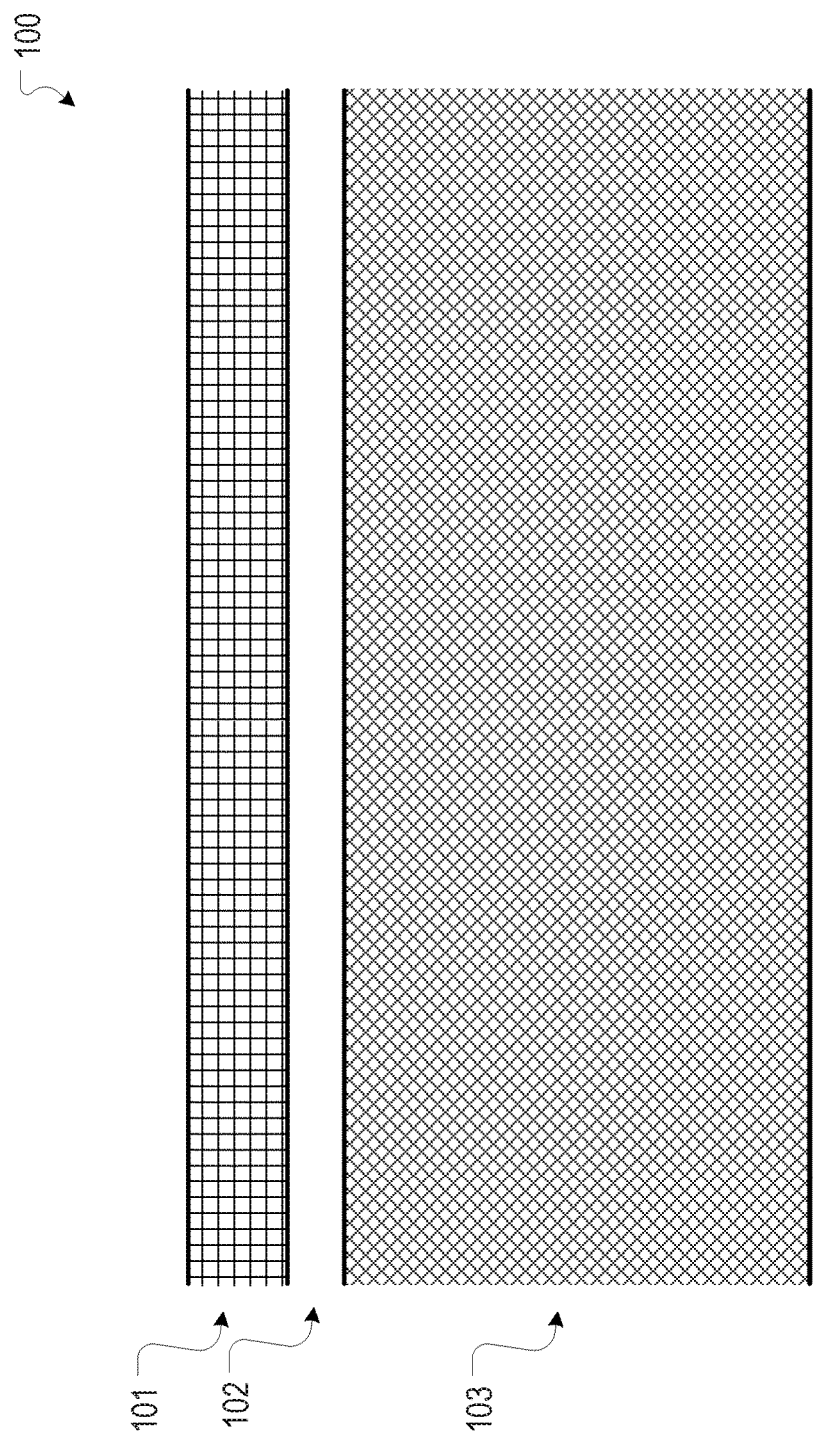
FIG. 1 depicts a cross-sectional view of an elastomeric tool, according to an embodiment of the present disclosure.

The drawings are provided for purposes of illustration only and merely depict typical or example implementations. One skilled in the art will readily recognize from the following discussion that alternative embodiments of the structures and methods illustrated in the figures can be employed without departing from the principles of the disclosed technology described herein. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF VARIOUS EMBODIMENTS

Elastomeric tooling can be used in the manufacturing of composites. Elastomeric tooling can be particularly advantageous where the elastic properties of the materials provide advantages over hard tooling. Elastomeric tooling can be used at room temperature for applications such as debulking. Elastomeric tooling can also be used at elevated temperatures as trapped tooling, reusable vacuum bags, or for pressure distribution or intensification during the curing process.

Different synthetic rubbers can be utilized for elastomeric composite tooling. Silicone is most widely used due to its excellent high-temperature performance, high elongation capability, and repair-ability. Silicone also offers a variety of formulations with different characteristics, with hardness ranging from around 25 durometer to 90 durometer (Shore A). One limitation related to the use of silicone in composite manufacturing is its incompatibility with epoxy based resin systems. Many epoxy based resins chemically interact with silicone. The silicone may contaminate the epoxy and the epoxy can degrade the silicone. As a result, silicone is not an approved contact material for most resin systems containing epoxy.

High temperature Ethylene Propylene Diene Monomer (EPDM) formulations can also be used for elastomeric composite tooling. EPDM formulations are tough elastomers with fair elongation capabilities. However, EPDM formulations also interact with epoxy resin systems and generally cannot be in direct contact with the uncured composites. EPDM is also prone to degradation if exposed to oxygen at elevated temperatures.

Fluoroelastomers, such as Viton, can also be used for elastomeric tooling. Fluoroelastomers are generally chemically inert, typically do not interact with epoxy resin systems, and are often approved contact materials. Fluoroelastomer materials have similar high-temperature capabilities to silicones and low friction properties, which facilitates removal of trapped elastomeric tooling from cured composites. However, fluoroelastomers are typically significantly more expensive than silicones. Fluoroelastomers also have relatively poor elongation capabilities and poor tear resistance at elevated temperatures. Furthermore, fluoroelastomers are generally only available in a relatively narrow range of approximately 65-95 durometer. Unlike silicones, fluoroelastomers also generally need to be pressurized when cured, which requires autoclave or closed mold processing to form the elastomeric tools. In addition, it is difficult to repair fluoroelastomer materials, as they do not bond to themselves. These drawbacks greatly limit the use of fluoroelastomers for tooling used in composite manufacturing.

The presently disclosed technology utilizes the advantages of fluoroelastomers, such as the chemical inertness and low oxygen permeability, while minimizing and/or negating their drawbacks, such as high cost and inferior mechanical properties, by using the fluoroelastomers as an outer barrier layer for another base elastomer used as a base material. I certain embodiments, a sufficiently thin fluoroelastomer outer layer can follow the elastic behavior of the base material, making fluoroelastomer tooling with durometers outside of the fluoroelastomer range possible. The different elastomers (e.g., fluoroelastomer outer layer and base elastomer inner layer) can be bonded together with or without an interface layer depending on the base elastomer used. In various embodiments, the fluoroelastomer layer and/or the interface layer(s) between different elastomers can be painted onto a compression mold and/or laid-up as B-stage material in layers before vulcanization with the base material. Various aspects of the disclosed technologies are described in greater detail herein.

Under conventional approaches, fluoropolymers, such as fluorinated ethylene propylene (FEP) or polytetrafluoroethylene (PTFE) foils, have been used to encapsulate composite tooling. However, these materials have a significantly higher modulus and different shrink rate at elevated temperatures many base elastomers. These attributes can result in delamination of the foils after multiple uses. In addition, the modulus mismatch between the fluoropolymers and the base elastomers often results in wrinkles on the tooling when the tooling bends. These wrinkles transfer to the composite. These stiff fluoropolymer foils also greatly limit the expansion of elastomeric tooling such as elastomeric bladders.

The presently disclosed technology overcomes the limitations of conventional approaches by integrating different elastomers into sandwich structures for elastomeric tooling. The presently disclosed technology allows for lower cost tooling technology that avoids wrinkles and delamination, and overcomes limitations of base materials or contact materials on their own. Unlike bulk fluoroelastomers, various embodiments of the disclosed technology also allow a user to vulcanize elastomeric tooling containing fluoroelastomers without the use of an autoclave, thereby reducing production costs significantly.

FIG. 1 illustrates a cross-sectional view of an elastomeric tooling 100 according to an embodiment of the present disclosure. An outermost elastomeric fluoroelastomer layer 101 can comprise, consist of, or consistent essentially of a fluoroelastomer, such as Viton. This outermost fluoroelastomer layer 101 may be in direct contact with a composite (e.g., a composite being formed using the elastomeric tooling 100). Alternatively, the outermost fluoroelastomer layer 101 can contact additional barrier and/or breather layers that can be placed between the elastomeric tooling 100 and the composite being formed. This outermost layer 101 may have a durometer of less than 90 Shore A. The durometer of the outermost fluoroelastomer layer 101 may be different than the durometer of a base elastomer 103. The base elastomer 103 may comprise, consist of, or consist essentially of, for example, silicone, EPDM, or butyl rubber. The silicone, EPDM, or butyl rubber used in the base elastomer 103 can be selected based on the material having a temperature capability sufficient for curing of the composite being manufactured using the tooling 100.

In certain embodiments, the outermost fluoroelastomer layer 101 can be attached to the base elastomer 103 using an interface layer 102 for base material/fluoroelastomer combinations that exhibit insufficient adhesion. For example, in certain embodiments the interface layer 102 can comprise, consist of, or consist essentially of vinyl-methyl-polysiloxane (VMQ) silicone. In other embodiments, an interface layer 102 may not be needed at all, and the outermost fluoroelastomer layer 101 can be directly adhered to the base elastomer 103. This may be the case, for example, where the base elastomer 103 and the fluoroelastomer layer 101 exhibit a threshold level of adhesion when cured.

In certain embodiments, the base elastomer 103 may comprise a silicone material, the outermost fluoroelastomer layer 101 may comprise a Viton material, and both layers may be cured using a peroxide curing agent (e.g., the same peroxide curing agent, or different peroxide curing agents). Such formulations have been found to be effective for adhering the outermost fluoroelastomer layer 101 directly to the base elastomer 103 (i.e., without an intermediate interface layer 102). An example method for forming an elastomeric tooling (such as the elastomeric tooling 100), according to an embodiment of the present disclosure, is described below with reference to FIG. 4.

Because the base material 103 will not be in direct contact with a composite, reactivity of the base material 103 with the composite need not be a consideration. The base material can be selected for its mechanical or thermal performance or low cost without the limitation of being a contact material that will contact a composite. Furthermore, the outermost fluoroelastomer layer can have inferior mechanical properties or durometers, as the base material will provide advantages in mechanical properties.

It should be appreciated that the various layers shown in FIG. 1, as well as the other figures provided herein, are provided for ease of explanation, and may not be drawn to scale. For example, in an example implementation in which a fluoroelastomer layer is adhered to a base elastomer without an interface layer, the outermost fluoroelastomer layer may have a thickness of approximately 0.005 inches while the base material may have a thickness of 0.070 inches or greater. In such implementations, it has been discovered that the outermost fluoroelastomer layer exhibited durometer and elasticity measures outside of values typically seen in fluoroelastomers on their own. For example, placing a 0.005 inch layer of Viton on a 0.070 inch layer of silicone resulted in the thin layer of Viton exhibiting hardness (durometer) and elasticity properties outside of typical ranges for Viton, and more similar to silicone.

Figure 2:
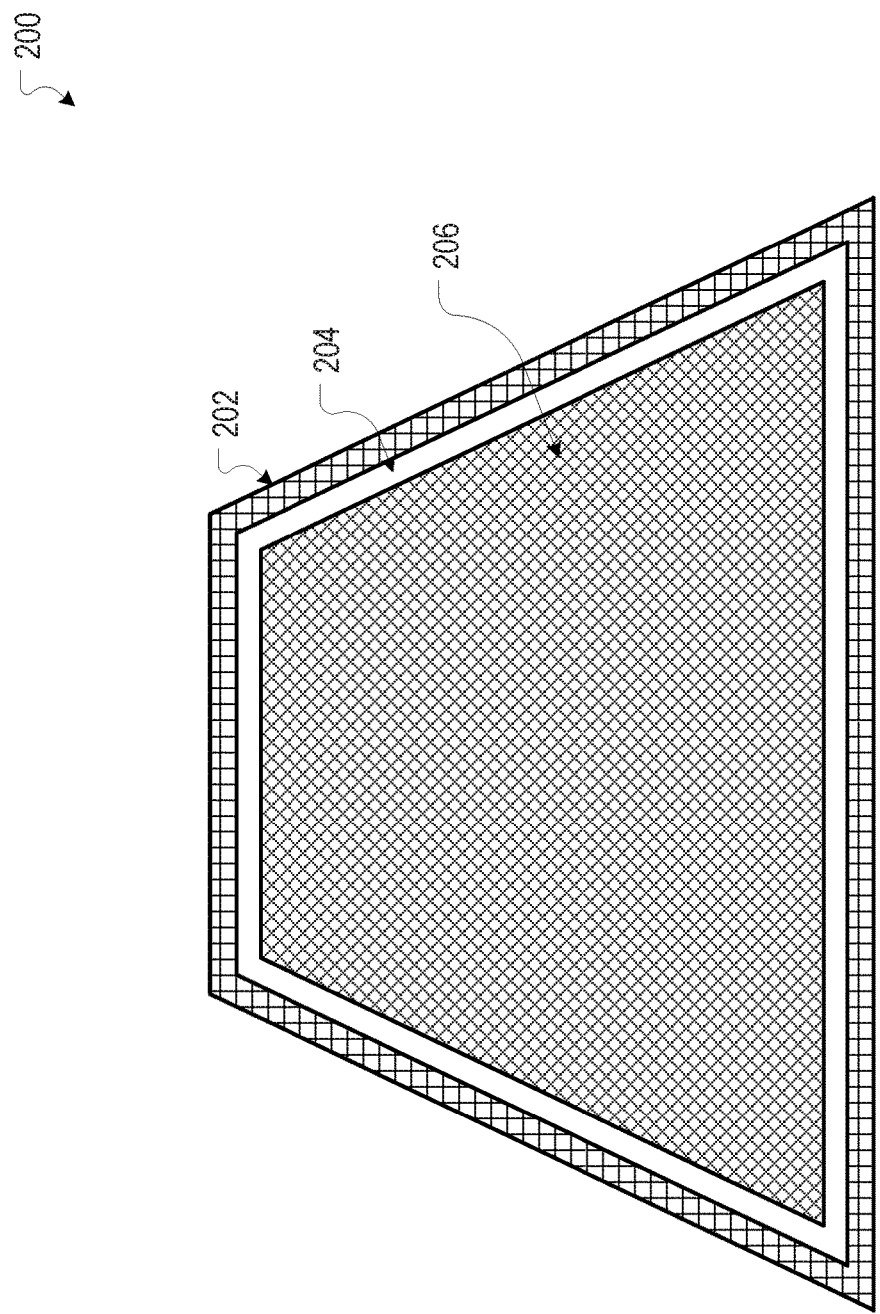
FIG. 2 depicts a cross-sectional view of an example elastomeric mandrel tool, according to an embodiment of the present disclosure.

FIG. 2 illustrates a cross-sectional view of an elastomeric tooling 200 in the form of a trapezoidal mandrel, according to an embodiment of the present disclosure. The elastomeric tooling 200 has a layer structure similar to that of the tooling 100 discussed above in FIG. 1. An outermost layer 202 of the tooling 200 is a fluoroelastomer layer which comprises, consists of, or consists essentially of consisting of a fluoroelastomer material, such as Viton. This outermost layer 202 may be in direct contact with a composite (e.g., a composite being formed using the tooling 200). Alternatively, the outermost layer 202 can contact additional barrier and/or breather layers that can be placed between the tooling 200 and the composite being formed. The durometer of this layer 202 may differ from the durometer of a base elastomer 206. In certain embodiments, the base elastomer 206 can comprise, consist of, or consist essentially of silicone, EPDM, or butyl rubber. The material for the base elastomer 206 may be selected to have a temperature capability sufficient for curing of the composite the tooling 200 is to be used for. Similar to the embodiment shown in FIG. 1, an interface layer 204 can be used if needed in order to adhere the outermost fluoroelastomer layer 202 to the base elastomer 206. In various embodiments, the interface layer 204 can comprise, consist of, or consistent essentially of VMQ silicone. In other embodiments, an interface layer 204 may not be needed at all, and the outermost fluoroelastomer layer 202 can adhere to the base elastomer 206 directly. In certain embodiments, a central portion of the elastomeric mandrel tooling 200 (e.g., the base material 206) can have openings, such as holes through the length of the mandrel tooling 200, if reduced expansion of the tooling is desired related to thermal expansion of the elastomeric tooling 200 during the composite curing process.

Figure 3:
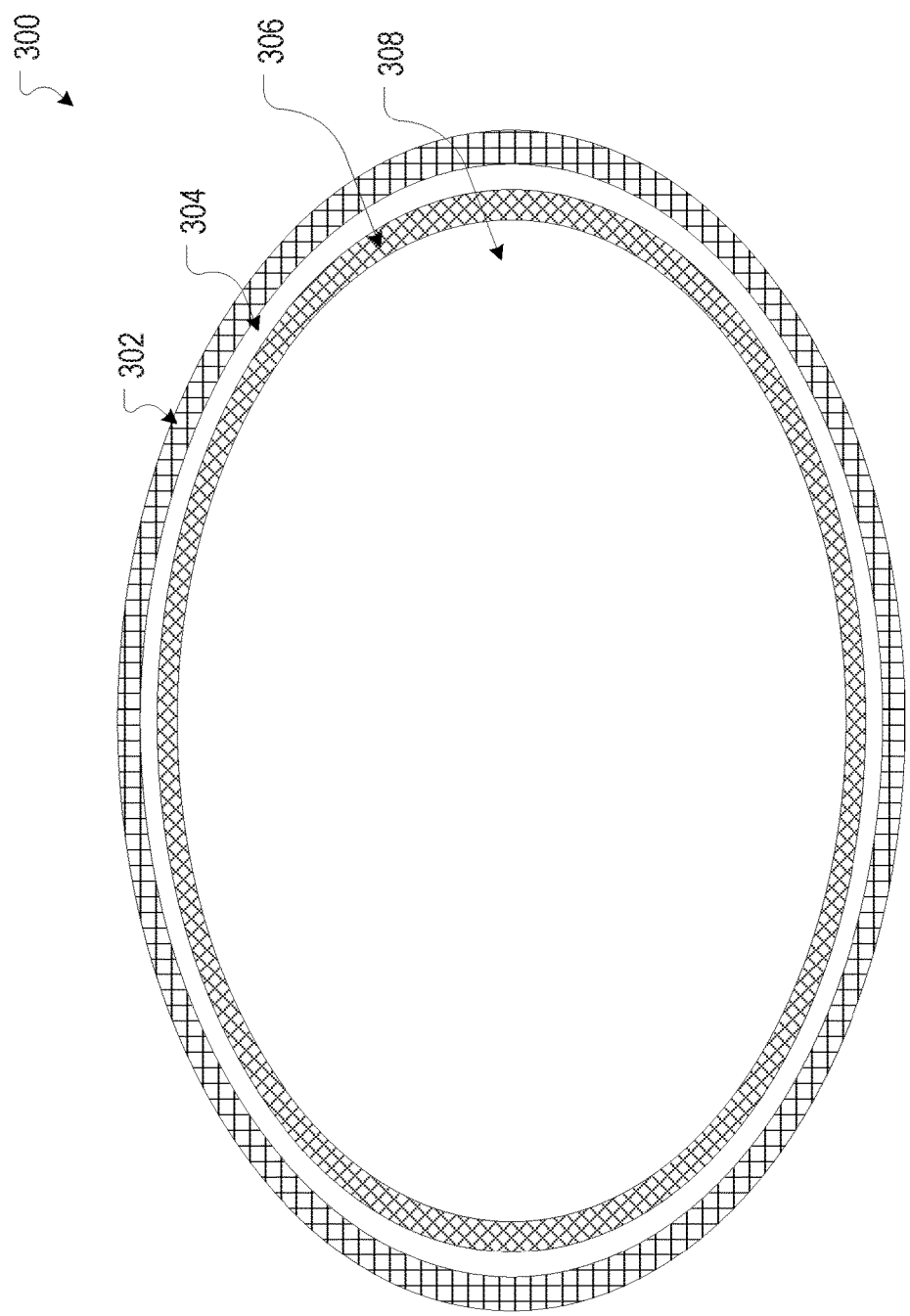
FIG. 3 depicts a cross-sectional view of an example elastomeric bladder tool, according to an embodiment of the present disclosure.

FIG. 3 depicts an embodiment of an elastomeric bladder tooling 300 in the form of a bladder or reusable vacuum bag, according to an embodiment of the present disclosure. The elastomeric bladder tooling 300 has a layer structure similar to that of the tooling 100 discussed above in FIG. 1. Similar to the prior figures, an outer fluoroelastomer layer 302 acts as a barrier layer against a composite or additional interface layers between the tooling 300 and a composite being formed. An interface layer 304 can be used as described above with reference to FIGS. 1 and 2. The majority of the elastomeric tooling 300 is in an inner layer 306 made of a base elastomer material. The base elastomer material can comprise, consist of, or consist essentially of silicone, EPDM, and/or butyl rubber having a sufficient temperature capability for curing of the composite being formed. In this particular embodiment, in which the elastomeric tooling 300 is in the form of a bladder, the elastomeric tooling 300 includes an inner cavity 308 which allows for positive or negative pressure to be applied to the elastomeric tooling 300 to either expand or contract the elastomeric tooling 300. For example, positive pressure can be applied via a gas to expand the elastomeric tooling 300 so that the elastomeric tooling 300 applies pressure to a composite being formed. Negative pressure can be applied (e.g., by removing gas from the cavity 308) to contract the elastomeric tooling 300 to make it easier to extract the elastomeric tooling 300 after a composite has been cured In the example embodiments described herein, the shape of the tooling (e.g., tooling 200 and 300) is presented for illustration purposes only. The cross-section of a tooling made according to the presently disclosed technology can be trapezoidal, square, oval, or any other shapes useful for forming composite cavities for a bladder. The tooling can also be a formed sheet for reusable vacuum bag applications.

Figure 4:
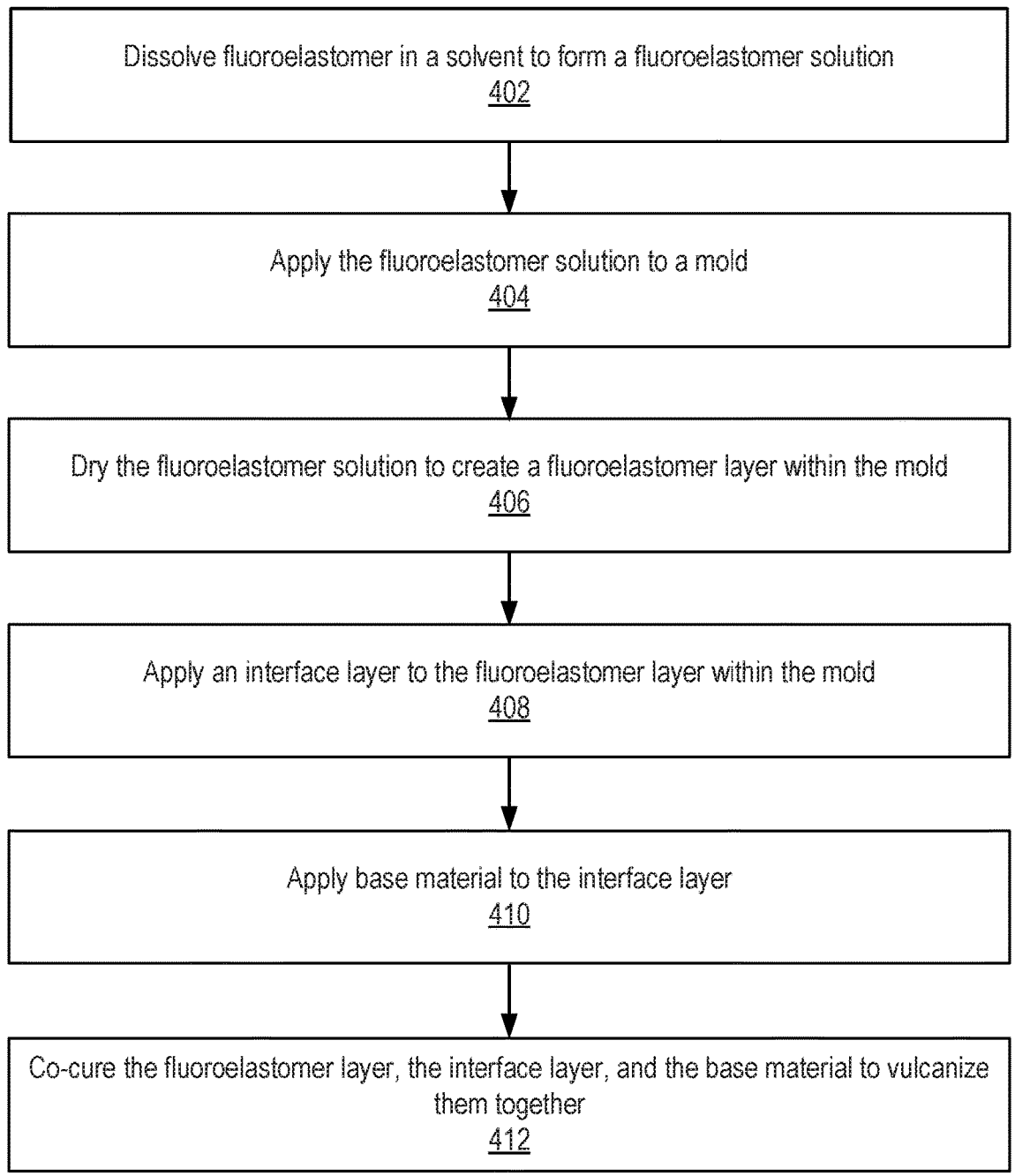
FIG. 4 depicts an example method for creating an elastomeric tool, according to an embodiment of the present disclosure.

FIG. 4 illustrates an example method 400 for forming an elastomeric tool, according to an embodiment of the present disclosure. At block 402, the example method 400 can dissolve a fluoroelastomer in a solvent. For example, the fluoroelastomer may be Viton, and the solvent may be acetone. The fluoroelastomer can include a curing agent. At block 404, the example method 400 can apply the fluoroelastomer solution to the inside of a compression mold or other tooling used to form the elastomeric tool. At block 406, the example method 400 can air dry the fluoroelastomer solution to create a fluoroelastomer layer. At block 408, the example method 400 can apply an interface layer to the fluoroelastomer layer in the mold. In certain embodiments, the interface layer can comprise, consistent of, or consistent essentially of a VMQ silicone. In certain embodiments, the interface layer can be applied to the fluoroelastomer layer by laying-up thin sheets of uncured B-stage material (e.g., sheets of B-stage VMQ silicone). In certain embodiments, the interface layer can include a curing agent. The curing agent may be the same as or different from that used in the fluoroelastomer layer. At block 410, the example method 400 can apply a base material to the interface layer. In various embodiments, the base material can comprise silicone, EPDM, and/or butyl rubber. In various embodiments, the base material can be applied to the interface layer by laying-up sheets of B-stage material (e.g., sheets of B-stage silicone, EPDM, and/or butyl rubber). In other embodiments, the base material can be applied to the interface layer by extruding the base material onto the interface layer. In certain embodiments, the base material can include a curing agent. The curing agent may be the same as or different from that used in the fluoroelastomer layer and/or the interface layer. Finally, at block 412, the method 400 can co-cure the fluoroelastomer layer, the interface layer, and the base material to vulcanize them together.

As discussed above, in certain embodiments, an interface layer may not be necessary, and the fluoroelastomer layer can be adhered directly to the base material. In such embodiments, block 408 can be removed from the example method 400, and at block 410, the base material can be applied directly to the fluoroelastomer layer. At block 412, the fluoroelastomer layer and the base material can be co-cured to vulcanize them together.

Figure 5:
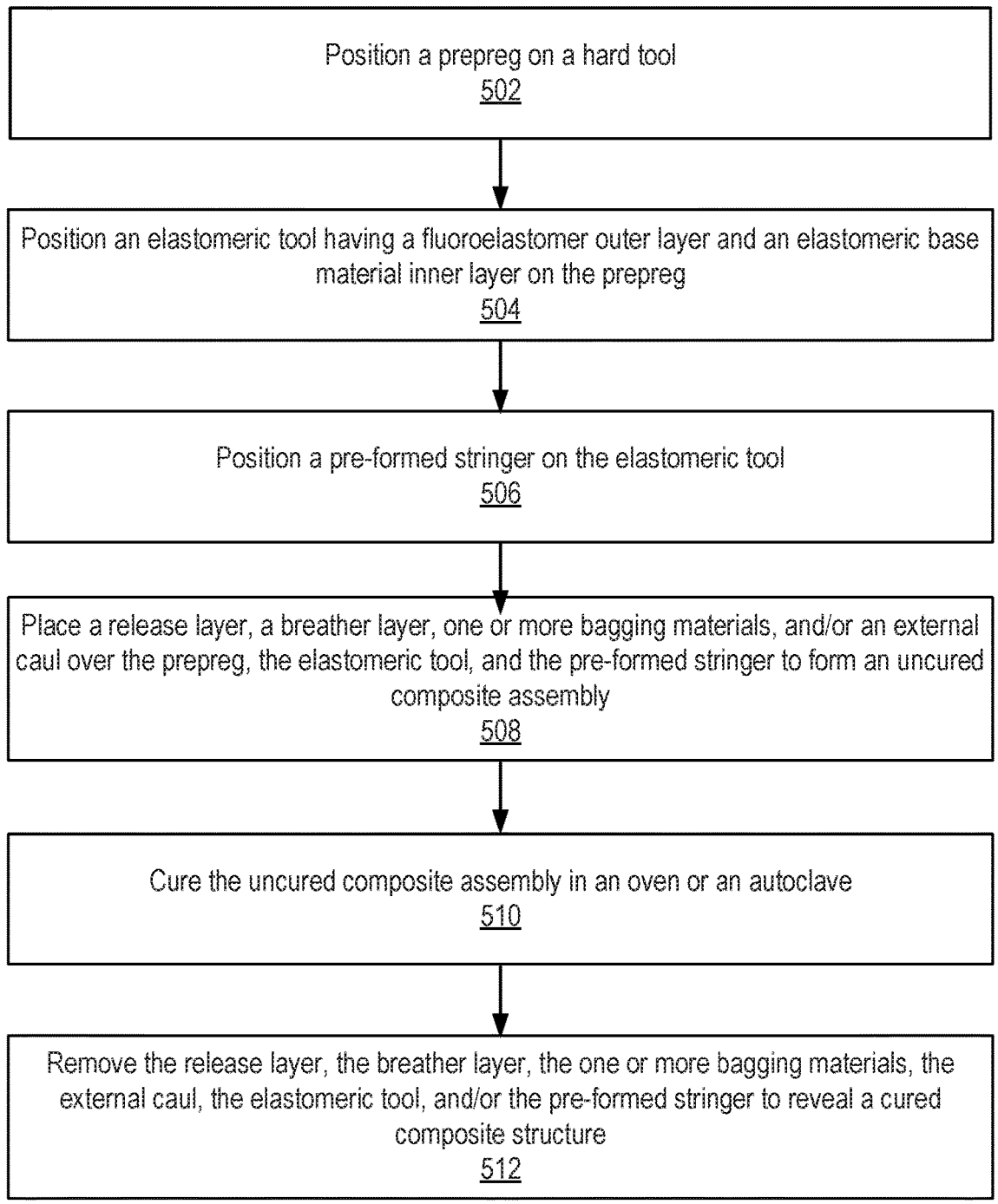
FIG. 5 depicts an example method for using an elastomeric tool, according to an embodiment of the present disclosure.

FIG. 5 illustrates an example method 500 for using an elastomeric bladder tooling to create a composite structure, according to an embodiment of the present disclosure. Composite structures are often formed using one or more layers of composite fibers that have been pre-impregnated with a resin system. For example, the composite fibers may comprise carbon fibers or glass fibers pre-impregnated with epoxy resin. Such layers are generally referred to as "prepregs." In a prepreg, the resin system is uncured or only partially cured. At block 502, the example method 500 can position a prepreg on a hard tool. At block 504, the example method 500 can position an elastomeric tooling having a fluoroelastomer outer layer and an elastomeric base material inner layer on the prepreg. At block 506, the example method 500 can position a pre-formed stringer on the elastomeric tool. At block 508, the example method can place a release layer, a breather layer, one or more bagging materials, and/or an external caul over the prepreg, the elastomeric tool, and the pre-formed stringer to form an uncured composite assembly. At block 510, the example method 500 can cure the uncured composite assembly in an oven or an autoclave. At block 512, the example method 500 can remove the release layer, the breather layer, the one or more bagging materials, the external caul, the elastomeric tool, and/or the pre-formed stringer to reveal a cured composite structure.

While various embodiments of the disclosed technology have been described above, it should be understood that they have been presented by way of example only, and not of limitation. Likewise, the various diagrams may depict an example structure or configuration for the disclosed technology, which is done to aid in understanding the features and functionality that can be included in the disclosed technology. The disclosed technology is not restricted to the illustrated example structures or configurations, but the desired features can be implemented using a variety of alternative structure and configurations. Indeed, it will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular structure or configuration.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. An elastomeric tooling for forming composites comprising:
an inert elastomeric outer layer comprising a fluoroelastomer, the inert elastomeric outer layer substantially defining an outer surface of the elastomeric tooling; and an elastomeric inner layer adhered to the inert elastomeric outer layer, the elastomeric inner layer comprising silicone having a durometer and an elasticity;

wherein the inert elastomeric outer layer has a thickness such that the inert elastomeric outer layer exhibits a durometer and an elasticity that are closer to the durometer and elasticity of the silicone than the fluoroelastomer on its own.

2. The elastomeric tooling of claim 1, wherein the fluoroelastomer is fluorine rubber.

3. The elastomeric tooling of claim 1, further comprising an elastomeric interface layer between the elastomeric outer layer and the elastomeric inner layer.

4. The elastomeric tooling of claim 3, wherein the elastomeric interface layer facilitates adhesion between the elastomeric outer layer and the elastomeric inner layer.

5. The elastomeric tooling of claim 4, wherein the elastomeric interface layer comprises vinyl-methyl-polysiloxane (VMQ) silicone.

6. The elastomeric tooling of claim 1, wherein the elastomeric tooling is a mandrel, and the elastomeric inner layer defines an innermost portion of the mandrel.

7. The elastomeric tooling of claim 1, wherein the elastomeric tooling is a bladder, the elastomeric inner layer substantially defines an inner cavity, and the elastomeric tooling can be expanded by applying a positive pressure to the inner cavity.

8. The elastomeric tooling of claim 1, wherein the elastomeric tooling is a sheet.

9. The elastomeric tooling of claim 1, wherein the thickness of the elastomeric outer layer is approximately 0.005 inches, and the elastomeric inner layer has a thickness of 0.070 inches or greater.

* * * * *